United States Patent Office 2,886,950
Patented May 19, 1959

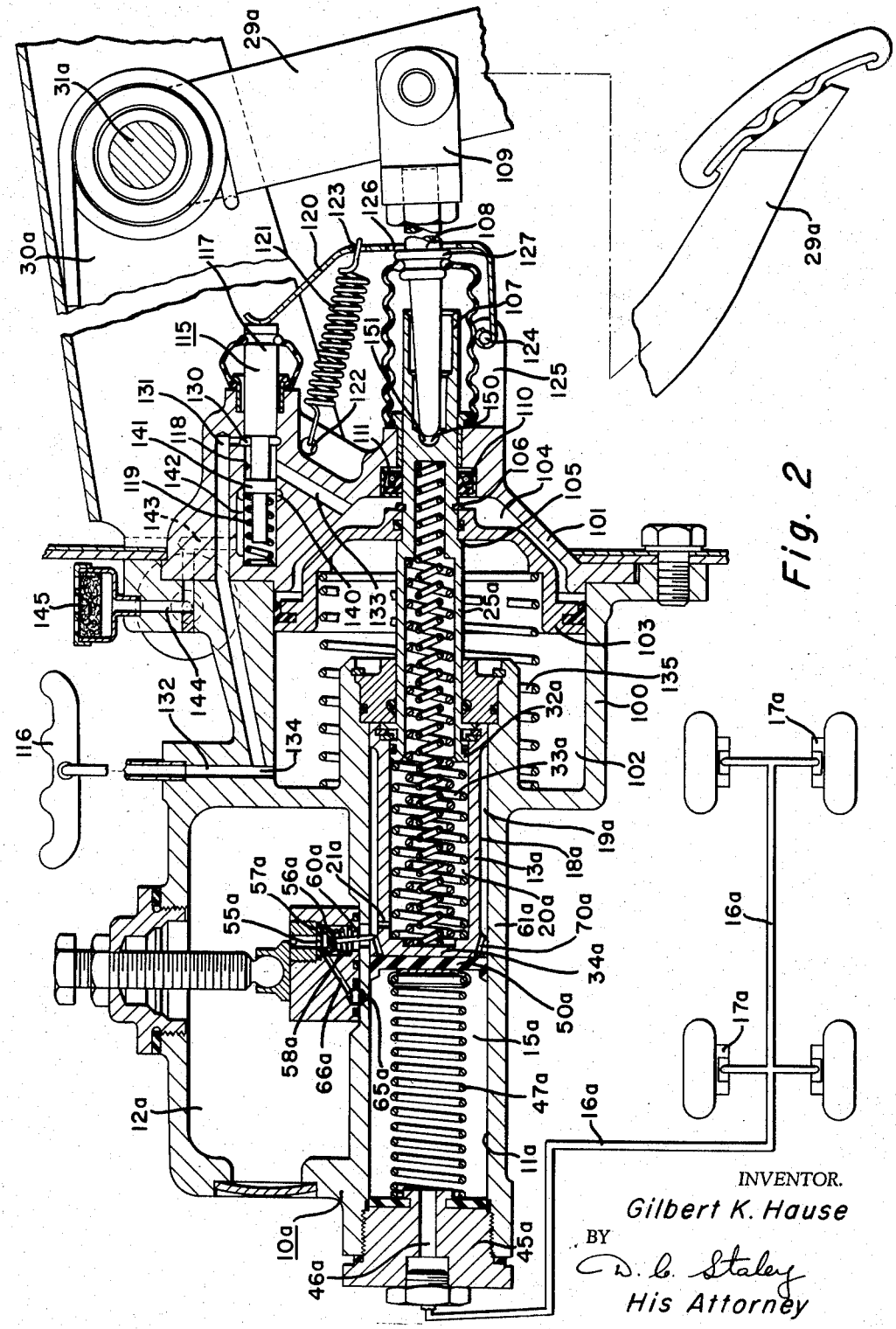

2,886,950
QUICK TAKE-UP MASTER CYLINDER

Gilbert K. Hause, Franklin, Mich., assignor to General Motors Corporation, Detroit, Mich., a corporation of Delaware Application May 13, 1957, Serial No. 658,619

6 Claims. (Cl. 60—54.6)

This invention relates to a master cylinder structure for a hydraulic brake system.

In most conventional hydraulic brake systems there is provided a certain amount of slack and also clearance between the friction elements and the friction surfaces of the brake that must be taken up before any actual brake actuation is occasioned. It is desirable to be able to take up the slack in the brake system and to effect engagement of the friction elements of the brake as quickly as possible with a low pedal effort and stroke and then be able to apply the brakes without a great increase in the pedal effort. To accomplish this it is therefore an object of this invention to provide for a master cylinder structure in which a relatively large hydraulic fluid displacement can be occasioned into the hydraulic lines of the brake system during an initial movement of the displacement member of the master cylinder, and then when the slack of the brake system during an initial movement of the displacement member of the master cylinder, and then when the slack of the brake system has been taken up and the friction elements are in engagement with one another and ready for a brake actuation, the rate of fluid displacement from the master cylinder will be reduced to that just sufficient to create the desired brake applying pressure but with a much higher mechanical advantage being available to create the hydraulic pressure during this period of brake application. This result can be obtained as disclosed in this invention by providing a piston that carries a plunger so that the piston and plunger can move as a unit structure during the initial period of operator actuation of the brakes to cause a large volume displacement of hydraulic fluid from the master cylinder into the brake system during initial movement of the piston and plunger, and as soon as the resistance pressure in the hydraulic brake system reaches a predetermined value representative of a complete take-up of slack in the brake system and engagement of the friction elements, the plunger carried within the piston will move relative to the piston to provide for a lower rate of fluid displacement from the master cylinder but at a higher mechanical advantage so that the pedal effort required to effect the brake actuation will not be substantially changed after the initial movement of the plunger and piston together so that there will be no substantial transition of reaction feel against the foot of the operator when the transition between large fluid displacement at low mechanical advantage and small fluid displacement of high mechanical advantage takes place.

Further objects and advantages of the present invention will be apparent from the following description, reference being had to the accompanying drawings wherein a preferred form of the invention is clearly shown.

In the drawings:

Figure 2 is a longitudinal cross sectional view of a modified structure of master cylinder incorporating a power cylinder for operating the device.

Figure 1:
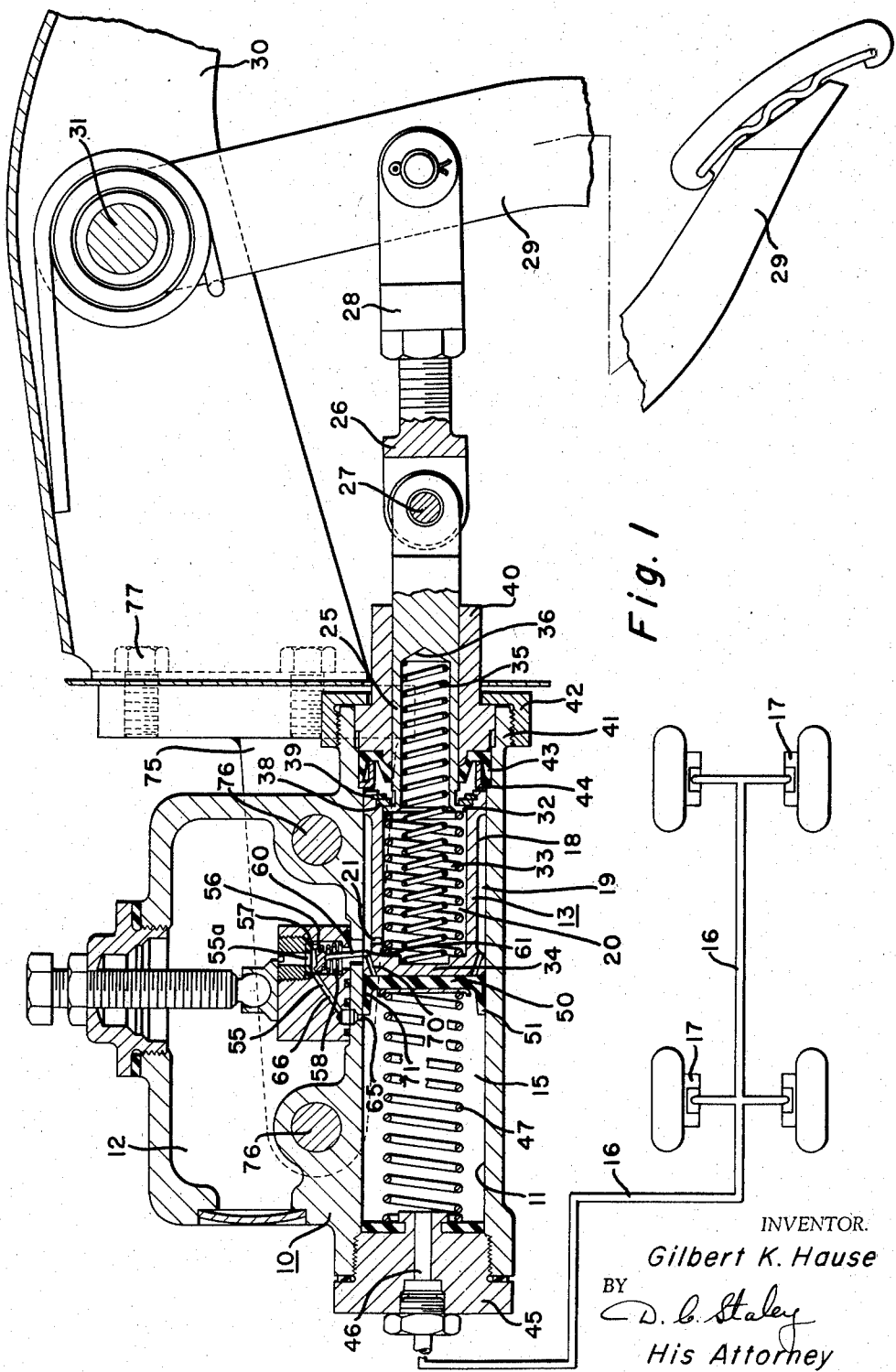
Figure 1 is a longitudinal cross sectional view of one form of master cylinder incorporating features of this invention.

In this invention the master cylinder structure comprises a body 10 that has a cylinder bore 11 and a reservoir chamber 12 adjacent the cylinder bore 11. Cylinder bore 11 carries a hollow displacement piston 13 that is slidable axially in the bore for displacement of hydraulic fluid from the displacement chamber 15 into the hydraulic brake system 16 that communicates with the wheel cylinders of the brake 17 of the vehicle in conventional manner.

The hollow piston 13 has a reduced diameter portion 18 around the periphery thereof that cooperates with the cylinder bore 11 to form an annular chamber 19 around the piston. The annular chamber 19 communicates with the interior bore 20 of the hollow piston 13 through an orifice passage 21 that provides for a controlled and regulated volume flow of hydraulic fluid from the bore 20 of the piston 13 into the chamber 19 for reasons hereinafter described.

The hollow piston 13 receives the forward end of a plunger member 25 that has its rearward end connected with a yoke member 26 and a pin 27 through the adjustable clevis 28 and connects with the brake pedal lever 29 that is carried on the frame member 30 of the vehicle by means of the pivot shaft 31.

The forward end portion of the plunger member 25 is an annular radial flange 32 that is engaged by a pressure spring 33 positioned between the flange and the end wall 34 of the hollow piston 13. A second compression spring 35 also extends from the end wall 34 of the piston 13 into a bore 36 in the plunger 25 to aid the spring 33. The springs 33 and 35 retain the flanged portion 32 of the plunger 25 in position against a stop ring 38 held in position in the piston 13 by a snap ring 39. Thus with the pedal lever 29 in released postion as shown in the drawing, the piston 13 and the plunger 25 will assume the positions in the drawing.

The plunger member 25 is journaled in a sleeve guide member 40 that is held in the rearward end 41 of the cylinder bore by means of a retaining nut 42. A double lip seal member 43 is positioned between the cylinder bore 11 and the plunger member 25 to seal against loss of fluid in a right hand direction. A retaining member 44 keeps the seal in place as shown in the drawing, and may also form a stop for the piston 13 in a movement in a right hand direction.

The opposite end of the cylinder bore 11 is closed by a closure member 45 that has a discharge port 46 therein to provide for displacement of fluid from the cylinder chamber 15 into the brake lines 16. A compression spring 47 is placed between the closure member 45 and the piston 13 to urge the piston to its retracted position as shown in the drawing.

The forward end wall 34 of the piston 13 supports a cup seal member 50 that has an annular lip 51 that seals upon the periphery of the bore 11 to prevent loss of fluid under pressure from the chamber 15 in a right hand direction in the bore 11.

The annular chamber 19 around the piston 13 communicates with the reservoir 12 through a valved passage 55 that contains a valve member 56 normally urged on its seat 57 by means of a compression spring 58. The valve 56 normally closes the passage portion 55a when the piston 13 is moved in a left hand direction.

The valve 56 has a stem 60 that is engaged by the radial shoulder 61 on the piston 13 to hold the valve 56 in open position when the piston 13 is in the right hand position illustrated in the drawing. Thus the reservoir 12 can communicate freely with the chamber 19 and thus with the hollow interior of the piston 13 for supply of hydraulic fluid for filling these respective chambers.

A port 65 in the wall of the cylinder bore 11 communicates with a passage 66 that in turn communicates with the passage 55a so that when the piston 13 is in the right hand position illustrated in the drawing hydraulic fluid from the reservoir chamber 12 can pass into the cylinder chamber 15 to provide for any make-up of hydraulic fluid required in the chamber 15. The lip 51 of the cup seal 50 is just to the right hand side of the port 65 when the piston 13 is in its full retracted position as shown on the drawing so that initial movement of the piston 13 in a left hand direction will close the port 65 and thereby condition the cylinder chamber 15 for displacement of fluid into the brake lines upon leftward movement of the piston 13.

Ports 70 are provided in the forward wall 34 of piston 13 communicating between the annular chamber 19 and the facial engagement between the wall 34 and the cup seal 50 to provide for flow of hydraulic fluid from the chamber 19 into the space of facial engagement between the wall 34 and the cup 50. Passage means 71 is provided at the outer periphery of the cup member 50 to receive the pressure fluid being exhausted through the port 70 into the interfacial space between the wall 34 and the cup 50 so that fluid under pressure can discharge into the cylinder chamber 15 around the outer periphery of the lip seal 51. This is occasioned only when there is relative movement between the plunger 25 and the piston 13.

In operation, when the pedal lever 29 is moved in a clock-wise direction, the plunger member 25 and the piston 13 will move forward in a left hand direction together as a unit structure because at this time the compression springs 33 and 35 hold the flange 32 of the plunger 25 against the retaining ring 38, there being only a minimum pressure existing in the cylinder chamber 15 that is insufficient to resist or overcome the compression of the springs 33 and 35. On the initial forward movement, that is in a left hand direction, of the piston and plunger the port 65 will be closed and the valve element 56 will be allowed to seat upon its seat 57 to close the passage with the reservoir chamber 12. Thus the hydraulic fluid in the chamber 15 will be displaced at a rate effected by the full facial area of the cup seal member 50, that is the full diameter of the cylinder bore 11 to take up the slack in the brake system and move the friction elements into engagement.

When the slack in the brake system is taken up and the friction elements are in engagement, pressure will be built up in the chamber 15 as occasioned by continued forward movement of the piston 13. When the hydraulic pressure in the chamber 15 is at least equal to the compression of the springs 33 and 35 jointly, the piston 13 will then move at the rate of displacement of fluid by plunger element 25 as it moves forward, that is in a left hand direction, relative to the piston 13 to effect displacement of hydraulic fluid from the hollow interior bore 20 of the piston 13. This builds up a pressure in areas 19 and 20 to where this pressure plus the springs 33 and 35 equal the pressure in chamber 15 with piston 13 moving to the left proportional to the areas of bore 11 and plunger element 25, so that volume-wise piston 13 and plunger 25 will displace equivalent volumes since their travels are proportional. It will be apparent that the facial area of the plunger 25 is considerably less than the facial area of the cup seal member 50 as driven by the piston 13 so that when the plunger 25 moves relative to the piston 13 there will be smaller volumes of fluid displaced from the cylinder 15 than when the plunger and piston moved as a unit, but the hydraulic fluid will be displaced at a much higher mechanical advantage because of the smaller facial area of the plunger 25.

During relative movement of the plunger with respect to the piston 13 the valve 56 will be closed so that fluid pressure cannot be discharged into the reservoir chamber 12; and since the port 65 will now be on the right hand side of the lip seal 51 as the cup seal 50 moves in a left hand direction, the fluid in the passages 55 and 66 will feel the same pressure that exists in chambers 19 and 20.

The passage 21 between the interior bore 20 of the piston 13 and the annular chamber 19 is a resistance passage to control the maximum rate of flow of hydraulic fluid from the chamber 20 into the annular chamber 19 on movement of the plunger 25 relative to the piston 13. This is to prevent an unusually rapid pedal depression by the operator of the vehicle without corresponding displacement of fluid from the master cylinder in the event the pedal is depressed for a panic stop. Under these conditions the major displacement of fluid will be from the chamber 15 in advance of the piston 13 and at a higher pedal pressure than would be occasioned under normal braking operations heretofore described.

The master cylinder may be carried upon brackets 75 by bolts 76, the brackets 75 being suitably secured to the forward wall of the passenger compartment of the vehicle by means of bolts 77.

In Figure 2 there is illustrated a modified structure of a master cylinder that is basically similar to that of Fig. 1 but with the exception that a power cylinder is adapted to provide a portion of the power for actuation of the plunger 25, and piston 13. The parts of the structure illustrated in Fig. 2 that are comparable with corresponding parts of the device of Fig. 1 will be referred to by the same reference numerals applied in Fig. 1 but with the suffix "a" added thereto.

The cylinder body 10a supports a power cylinder 100 that has a removable closure wall 101 forming thereby a chamber 102. A piston 103 forms a movable wall in the chamber 102 and a rearward chamber 104. The piston 103 is carried on the plunger rod 25a between a shoulder 105 and a retaining ring 106 whereby movement of the piston 103 in the cylinder 100 can effect power movement of the plunger 25a and piston 13a. The rearward end 107 of the plunger 25a is engaged by an actuating member 108 that is connected to the pedal lever 29a by the link 109. A seal member 110 placed around the plunger 25a and within the recess 111 of the closure wall 101 prevents loss of vacuum pressure along the plunger.

Valve member 115 controls connection of the chamber 104 with a vacuum source such as the manifold 116 of the engine of the vehicle or with atmosphere for power actuation of the piston 103.

The control valve 115 consists of a cylindrical member 117 that slides within a valve bore 118, a compression spring 119 normally urging the valve member 117 against an actuating member 120 that is held against the right hand end of the valve member 117 by a tension spring 121 having one end thereof carried in the opening 122 in the cover plate 101 and the opposite end carried in the opening 123 in the actuating member 120. The actuating member 120 is pivoted on a pin 124 extending between a pair of arms 125 on the closure member 101. The member 120 has a vertical slot 126 through which the actuating member 108 extends, the slot 126 allowing pivotal rotation of the member 120 about the pin 124 when the member 108 moves in a left hand direction. Normally the member 120 is held in the position shown in Figure 2 by means of the collar 127 on the member 108 so that the actuating member 120 is in position to allow the spring 119 of the valve 115 to position the element 117 in the position shown in the drawing so that the annular passage 130 that communicates with the passage 131 will permit connection of the manifold 116 of the engine with the chamber 104 through the port inlet 132, passage 131, annular passage 130 and passage 133. The manifold 116 of the engine is also connected with the chamber 102 through the port 134 so that vacuum is present on both sides of the piston 103 whereby the compression spring 135 places the piston 103 in the position illustrated in Figure 2.

A second annular passage 140 is normally closed by the land 141 of the spool valve element 117, the passage 140 providing for connection of the chamber 104 with atmosphere through the passage 142, passage 143 and inlet port 144 that communicates with an air filter 145 on the inlet passage.

To secure power operation of the plunger 25a and the piston 13a, movement of the pedal lever 29a in a clockwise direction about the pivot 31a will cause leftward movement of the member 108 that normally has a clearance space 150 provided between the end of the member 108 and the inner end of the recess 151 provided in the plunger 25a. This initial movement of the member 108 will allow the member 120 to move the spool valve 117 in a left hand direction and thereby close off the annular passage 130 so that the vacuum connection with the passage 131 is discontinued.

Further movement of the pedal arm 29a in a clockwise direction will move the valve member 117 until the right hand edge of the land 141 uncovers the annular passage 140 to allow atmospheric air to enter the chamber 104 from the air filter 145 and through the passages 144, 143 and 142 whereby air under pressure in the chamber 104 causes left hand movement of the piston 103 to power actuate the plunger 25a and piston 13a.

Power actuation of the plunger 25a and piston 13a causes operation of the master cylinder in exactly the same manner as pedal operation of the master cylinder heretofore described with reference to Figure 1.

While the form of embodiment of the invention as herein disclosed constitutes a preferred form, it is to be understood that other forms might be adopted as may come within the scope of the claims which follow.

What is claimed is as follows.

1. A master cylinder for a hydraulic brake system, comprising, a body having a cylinder bore and a reservoir chamber adjacent said cylinder bore, a hollow piston slidable in said bore, plunger means within said piston movable axially therein to effect displacement of fluid from within said piston, said plunger means extending exteriorly of said piston and said bore for operator actuation, spring means urging said plunger means toward one end of said piston and opposing operator actuation of said plunger means, said spring means having force opposing relative movement between said plunger means and said piston until hydraulic pressure in said cylinder in advance of said piston at least equals the said opposed force whereafter said plunger means can move relative to said piston and concurrently with movement of said piston, and first passage means between said hollow piston and said cylinder in advance of said piston normally open between said hollow piston and said cylinder in advance of said piston and normally closed valved passage means connecting said first passage means with said reservoir, when said plunger is at one end of said piston as urged by said spring and providing free interchange of fluid between said cylinder, said chamber and said hollow piston and on movement of said piston said valved passage means being self-closing to provide closed chamber means for displaced fluid on relative movement of said piston and plunger to provide for displacement of fluid from said cylinder by said piston in proportion to the displacement area of said plunger.

2. A master cylinder for a hydraulic brake system, comprising, a body having a cylinder bore and a reservoir chamber adjacent said cylinder bore, a hollow piston slidable in said bore, plunger means within said piston movable axially therein to effect displacement of fluid from within said piston, said plunger means extending exteriorly of said piston and said bore for operator actuation, spring means urging said plunger means toward one end of said piston and opposing operator actuation of said plunger means, said spring means having force opposing relative movement between said plunger means and said piston until hydraulic pressure in said cylinder in advance of said piston at least equals the said opposed force whereafter said plunger means can move relative to said piston and concurrently with movement of said piston, first passage means between said hollow piston and said reservoir including spring biased valve means held in open position when said piston is at one end of said bore, second passage means connecting said first passage means with said cylinder in advance of said piston whereby said first and second passage means provides free communication between said cylinder in advance of said piston and said hollow piston and said reservoir when said piston is at one end of said bore, said first passage being closed by said spring biased valve means in said first passage means on initial movement of the piston axially in said bore as caused by operator actuation, and third passage means between said hollow piston and said cylinder in advance of said piston providing for pressure flow from the hollow piston to the cylinder in advance of said piston on any relative movement of said plunger and said piston.

3. Apparatus in accordance with the preceding claim in which said third passage means includes fluid flow restriction means to resistively control displacement of fluid from within said hollow piston on relative movement between said piston and said plunger.

4. A master cylinder for an hydraulic brake system, comprising, a body having a cylinder bore and a reservoir chamber adjacent said cylinder bore, a hollow piston slidable in said bore and having a reduced diameter on the periphery thereof forming with said bore an annular chamber around said piston, first passage means connecting the interior of said hollow piston with said chamber, plunger means within said piston movable axially therein to effect displacement of fluid from within said piston through said first passage means, said plunger means extending exteriorly of said piston and bore for operator actuation, spring means urging said plunger means toward one end of said piston and opposing operator actuation of said plunger means, said spring means having force opposing relative movement between said plunger means and said piston until hydraulic pressure in said cylinder in advance of said piston means at least equals the said opposing force whereafter said plunger can move relative to said piston and concurrently with movement of said piston, second passage means connecting said chamber with said reservoir and including biased valve means therein normally closed but held in open position by said piston when said piston is at one end of said bore, third passage means connecting said second passage means with said cylinder bore in advance of said piston, said first, second and third passage means providing for free intercommunication of fluid flow between said reservoir and said hollow piston and said cylinder bore in advance of said piston when said piston is at said one end of said bore, said plunger causing movement of said piston with said plunger permitting closing of said biased valve means in said second passage and closing of said third passage on initial movement of said plunger and equivalent movement of said plunger and piston until hydraulic pressure in advance of said piston at least equals the said opposing force of said spring means whereafter said plunger moves relative to said piston for movement of said piston proportional to the displacement areas of said plunger and piston.

5. Apparatus in accordance with claim 4 in which said first passage means includes resistance passage to the flow of fluid between the interior of said hollow piston and said chamber to control maximum rate of movement of said plunger relative to said piston.

6. Apparatus in accordance with claim 4 in which a cup seal member is carried on the forward end of said piston and has an annular lip portion engaging said cylinder bore to provide for closing off of said third passage means upon initial movement of said piston concurrently with closing of said valve means in said second passage means during the initial movement of the piston as caused by operator actuation.

References Cited in the file of this patent

UNITED STATES PATENTS

| | | |
|---|---|---|
| 1,885,552 | Sawtelle | Nov. 1, 1932 |
| 2,130,799 | Hofstetter | Sept. 20, 1938 |
| 2,154,111 | Rossmann | Apr. 11, 1939 |
| 2,179,241 | Groves | Nov. 7, 1939 |
| 2,265,546 | Price | Dec. 9, 1941 |
| 2,277,336 | Loweke | Mar. 24, 1942 |
| 2,313,274 | Schnell | Mar. 9, 1943 |
| 2,407,957 | Hull-Ryde | Sept. 17, 1946 |
| 2,433,213 | Groves | Dec. 23, 1947 |
| 2,456,325 | Roy | Dec. 14, 1948 |